United States Patent
Unruh

(10) Patent No.: US 9,586,711 B1
(45) Date of Patent: Mar. 7, 2017

(54) AUTOMATED SEED PACKET HANDLING MACHINE AND METHOD FOR RESEARCH PLOT SEED PLANTERS

(71) Applicant: Seed Research Equipment Solutions, LLC, S. Hutchinson, KS (US)

(72) Inventor: Stacy L. Unruh, Haben, KS (US)

(73) Assignee: Seed Research Equipment Solutions, LLC, South Hutchinson, KS (US)

( * ) Notice: Subject to any disclaimer, the term of this patent is extended or adjusted under 35 U.S.C. 154(b) by 137 days.

(21) Appl. No.: 14/208,123

(22) Filed: Mar. 13, 2014

Related U.S. Application Data

(60) Provisional application No. 61/779,481, filed on Mar. 13, 2013.

(51) Int. Cl.
*B65B 69/00* (2006.01)
*A01C 7/00* (2006.01)
*A01C 21/00* (2006.01)

(52) U.S. Cl.
CPC .......... *B65B 69/0008* (2013.01); *A01C 7/00* (2013.01); *A01C 21/00* (2013.01)

(58) Field of Classification Search
CPC ....... A01C 7/00; A01C 21/00; B65B 69/0008; B65B 69/00
See application file for complete search history.

(56) References Cited

U.S. PATENT DOCUMENTS

| | | | |
|---|---|---|---|
| 2,930,476 A * | 3/1960 | Andrews | B65B 35/38 270/58.29 |
| 5,001,833 A * | 3/1991 | Haage | B43M 7/008 30/134 |
| 6,615,754 B2 | 9/2003 | Unruh et al. | |
| 6,941,225 B2 | 9/2005 | Upadhyaya et al. | |
| 7,975,632 B2 | 7/2011 | Gogerty et al. | |
| 8,473,168 B2 | 6/2013 | Goldman et al. | |
| 8,639,383 B2 | 1/2014 | Goldman et al. | |
| 2010/0070072 A1 * | 3/2010 | Goldman | A01C 21/005 700/225 |

* cited by examiner

*Primary Examiner* — Christopher J Novosad
(74) *Attorney, Agent, or Firm* — Jeffrey L. Thompson; Thompson & Thompson, P.A.

(57) ABSTRACT

An automated seed packet handling machine is provided for use on research plot seed planters. The seed packet handling machine includes a tray for holding a box containing seed packets. A first actuator has suction cups for lifting a single seed packet out of the box and moving the seed packet to a cutter mechanism for cutting off a top portion of the seed packet. A second actuator has suction cups for holding the seed packet after the top portion has been cut off, and for flipping the seed packet upside down to dump seeds from the packet into a seed chute. A computer controller controls the sequence of operations of the first actuator, the cutter mechanism, and the second actuator. An RFID reader is provided to read RFID tags on the seed packets to keep track of where each seed packet is planted in the research field.

19 Claims, 15 Drawing Sheets

AUTOMATED SEED PACKET HANDLING MACHINE AND METHOD FOR RESEARCH PLOT SEED PLANTERS

RELATED APPLICATIONS

This application claims the benefit of U.S. Provisional Patent Application No. 61/779,481 filed on Mar. 13, 2013. The entire content of the priority application is incorporated herein by reference.

BACKGROUND OF THE INVENTION

Field of the Invention

The present invention relates generally to seed planters and material handling machines, and in particular to an automated seed research plot planter.

Description of the Related Art

Seed researchers typically organize seed varieties for planting test plots by filling paper envelopes (referred to herein as seed packets) with seed and stacking them in a cardboard box to keep them in order. While planting, a worker pulls an envelope out of the box, rips off the top, and dumps the seed into the planter for each individual plot. This process is tedious, requires additional workers to ride on the planter during planting, and sometimes leads to operator error.

SUMMARY OF THE INVENTION

It is an object of the present invention to provide an automated seed packet handling machine that performs operations that were previously done manually by a worker riding on the planter.

To accomplish these and other objects of the invention, an automated seed packet handling machine is provided for use on research plot seed planters. The seed packet handling machine includes a tray for holding a box containing seed packets. A first actuator has suction cups for lifting a single seed packet out of the box and moving the seed packet to a cutter mechanism for cutting off a top portion of the seed packet. A second actuator has suction cups for holding the seed packet after the top portion has been cut off, and for flipping the seed packet upside down to dump seeds from the packet into a seed chute. A computer controller controls the sequence of operations of the first actuator, the cutter mechanism, and the second actuator. An RFID reader is provided to read RFID tags on the seed packets to keep track of where each seed packet is planted in the research field.

According to one aspect of the present invention, an automated seed packet handling machine is provided, comprising: a tray for holding a box containing seed packets; a cutter mechanism for cutting off a top portion of a seed packet; a first actuator for lifting a seed packet out of the box and moving the seed packet to the cutter mechanism; a seed chute for conveying seeds to a seed meter of a planter row unit; and a second actuator for flipping the seed packet upside down to dump seeds from within the packet into the seed chute after the top portion of the seed packet is cut off.

According to another aspect of the present invention, a research plot seed planter is provided, comprising: at least one planter row unit having a seed meter with a seed chamber for receiving seeds to be planted; a seed chute for conveying seeds into the seed meter; and an automated seed packet handling machine for lifting a seed packet from a box, cutting off a top portion of the seed packet, and dumping the seeds from the seed packet into the seed chute.

According to another aspect of the present invention, a method of planting seed research plots is provided, comprising: providing a planter having at least one planter row unit comprising a seed meter with a seed chamber for receiving seeds to be planted; providing a seed packet handling machine on the planter with a seed chute that directs seeds into the seed meter; and using the seed packet handling machine to automatically lift individual seed packets containing a plurality of seeds from a box containing a plurality of seed packets, cut off a top portion of the seed packets, and dump the seeds from the seed packets into the seed chute to supply seeds to the seed chamber of the seed meter.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 12 illustrates a box of seed packets being loaded into the tray.

FIG. 13 illustrates a spring-loaded pusher assembly of the tray that keeps the seed packets pushed to the front of the box.

FIG. 14 illustrates a seed packet being lifted out of the box using suction cups on the first actuator.

FIG. 15 illustrates a seed packet passing through the motorized cutter to remove the top of the seed packet.

FIG. 16 illustrates a seed packet being handed off from the first actuator to the second actuator.

FIG. 17 illustrates a seed packet being flipped upside down by the second actuator to dump the seeds into the seed chute.

DETAILED DESCRIPTION OF THE INVENTION

A research plot planter and automated seed packet handling machine according to the present invention will now be described with reference to FIGS. 1 to 17 of the accompanying drawings.

Figure 1:
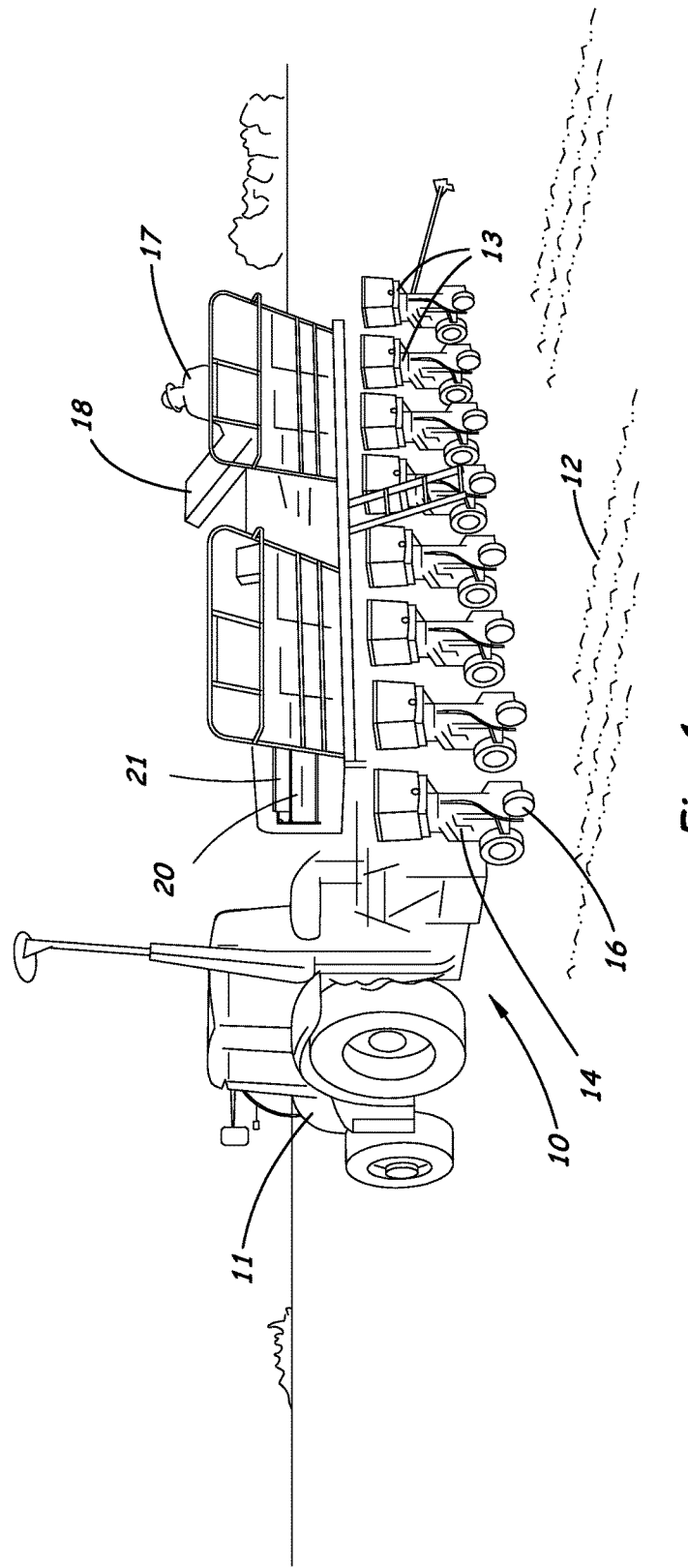
FIG. 1 is a perspective view of a research plot planter being pulled by a tractor through a research plot field.
Figure 2:
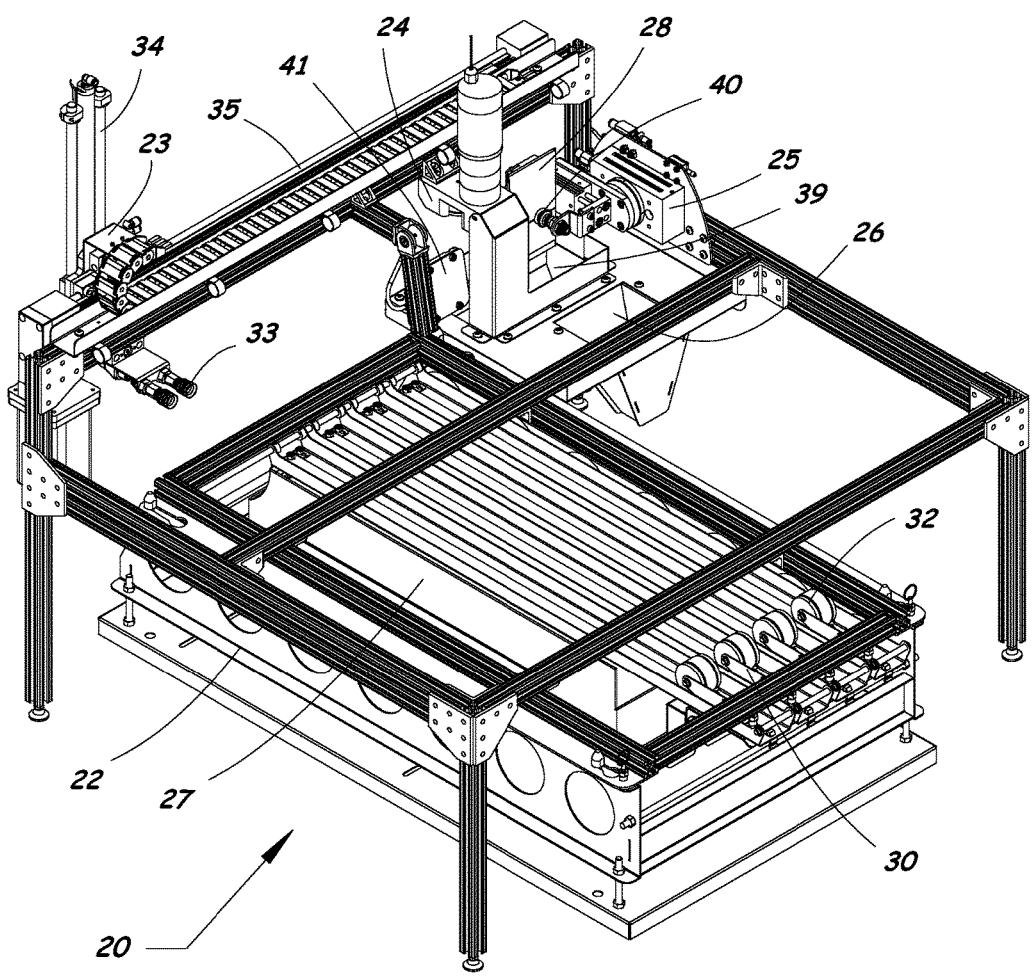
FIG. 2 is a rear perspective view of an automated seed packet handling machine according to the present invention for use with a research plot planter.
Figure 3:
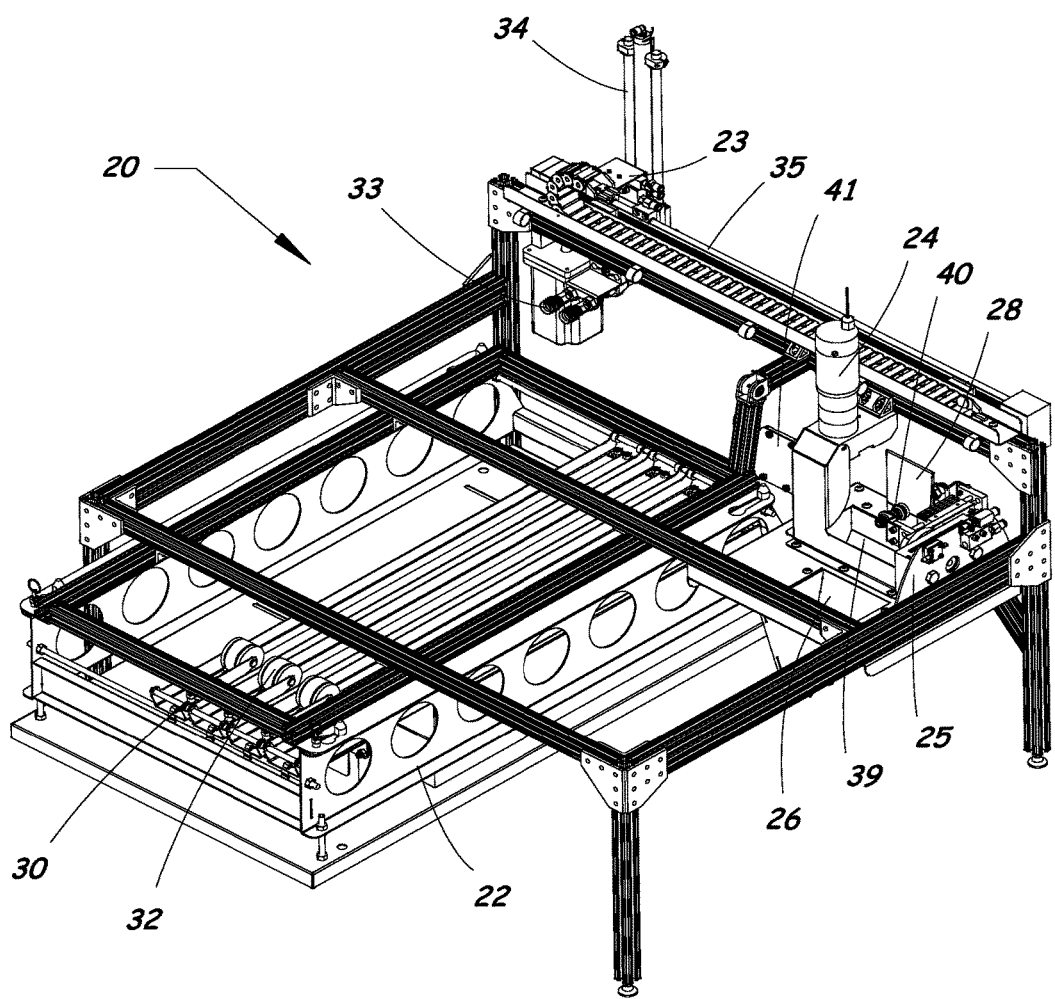
FIG. 3 is another rear perspective view of the automated seed packet handling machine.
Figure 4:
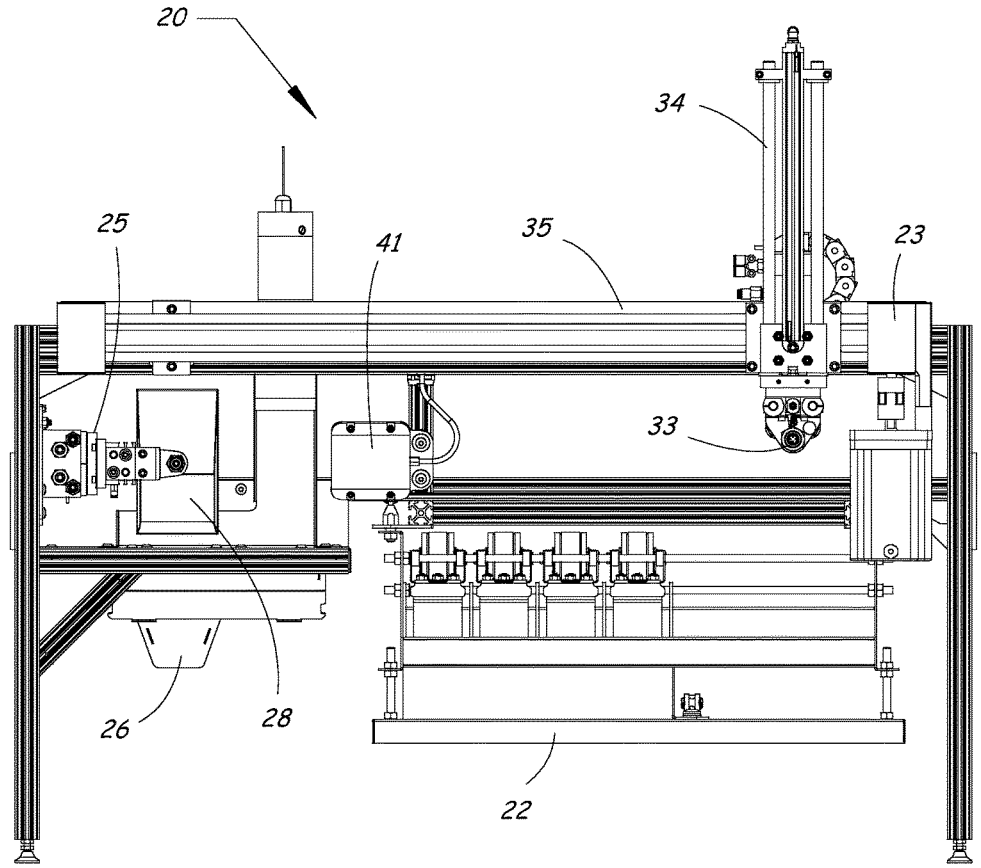
FIG. 4 is a front view of the automated seed packet handling machine.
Figure 5:
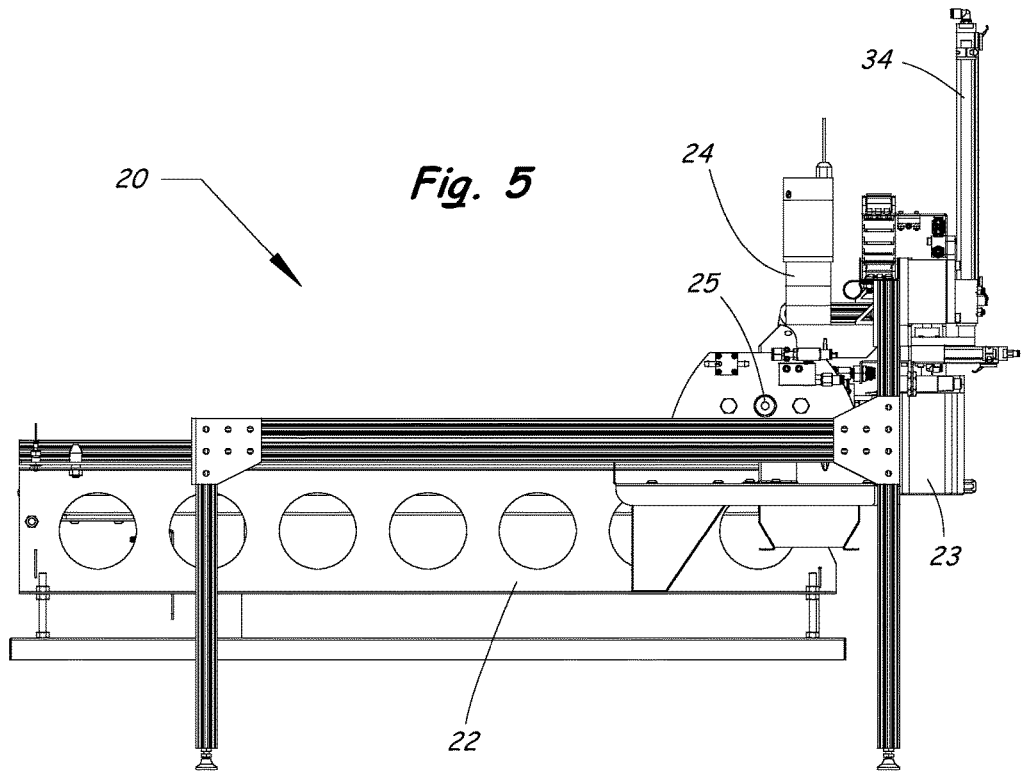
FIG. 5 is a left side view of the automated seed packet handling machine.
Figure 6:
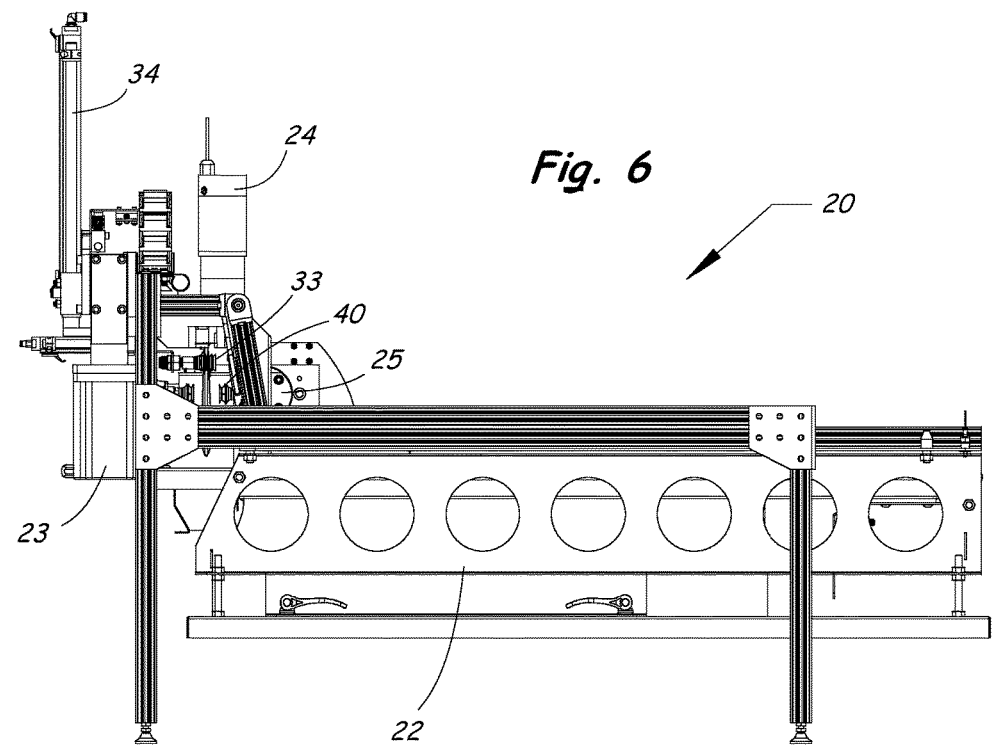
FIG. 6 is a right side view of the automated seed packet handling machine.
Figure 7:
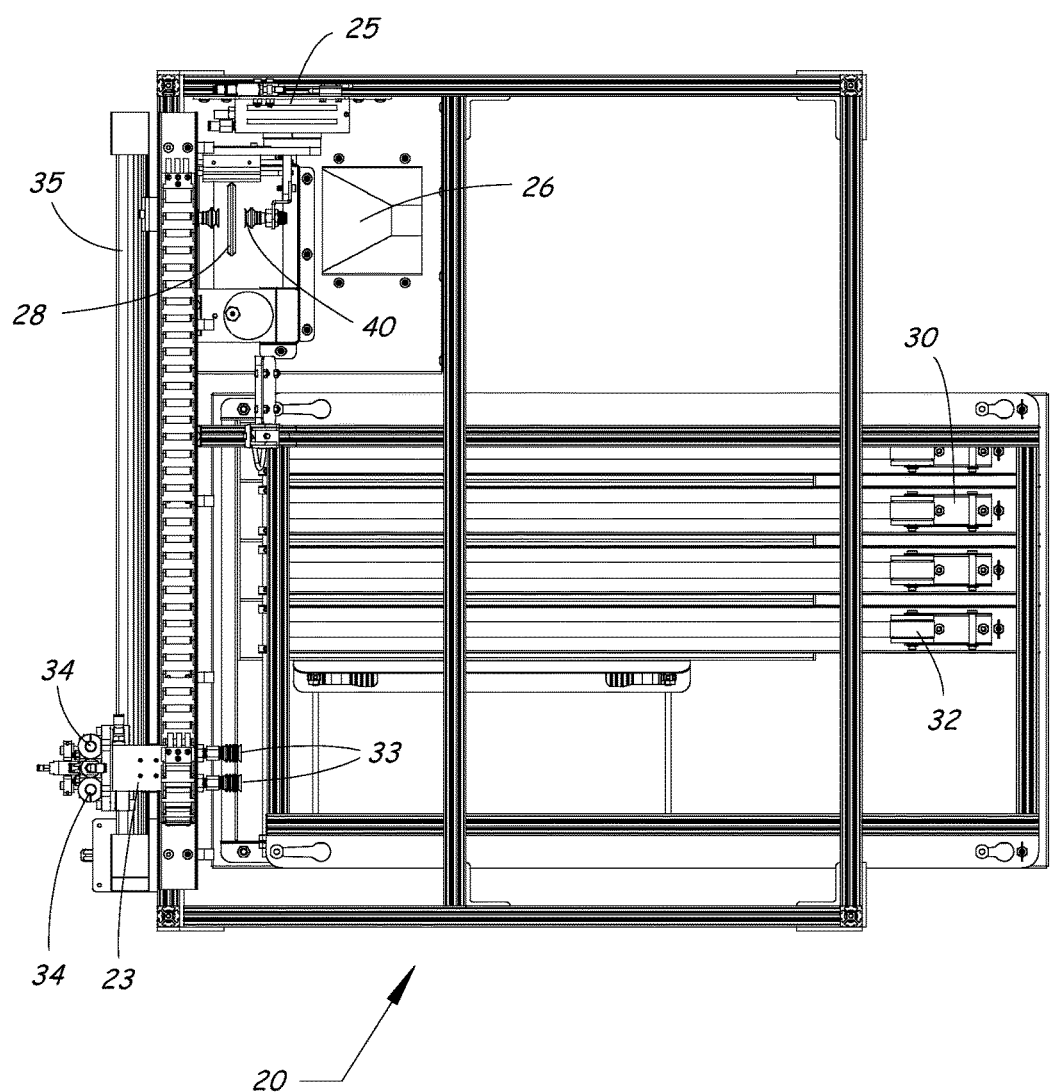
FIG. 7 is a top plan view of the automated seed packet handling machine.
Figure 8:
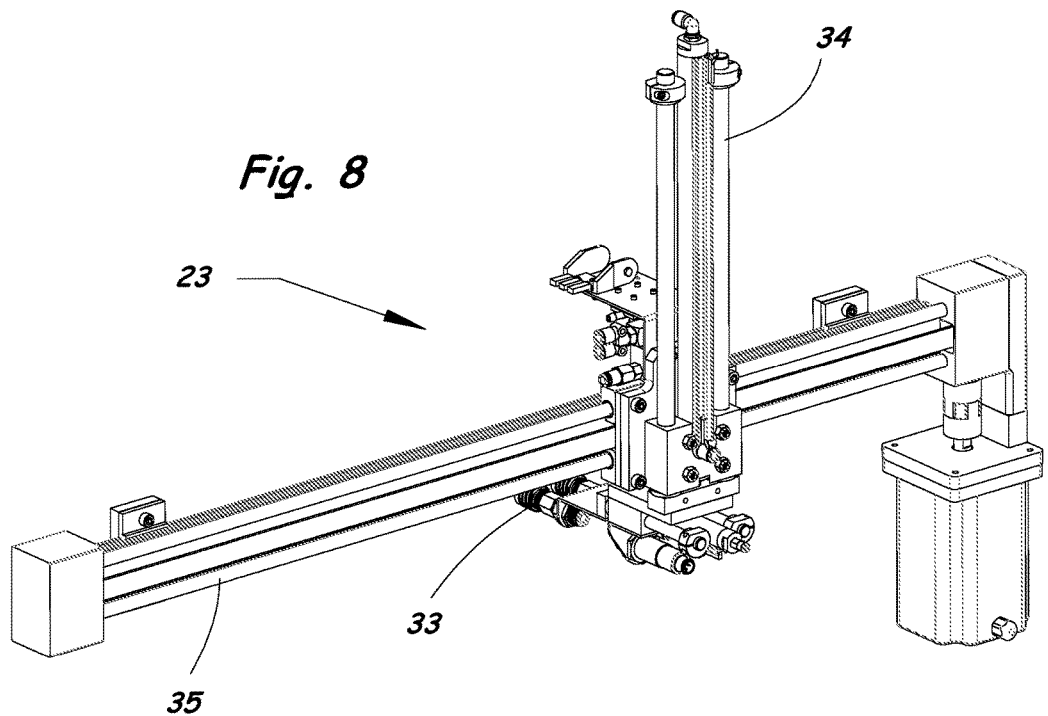
FIG. 8 is a perspective view of a first actuator used to lift and carry seed packets from a box to a motorized cutter.
Figure 9:
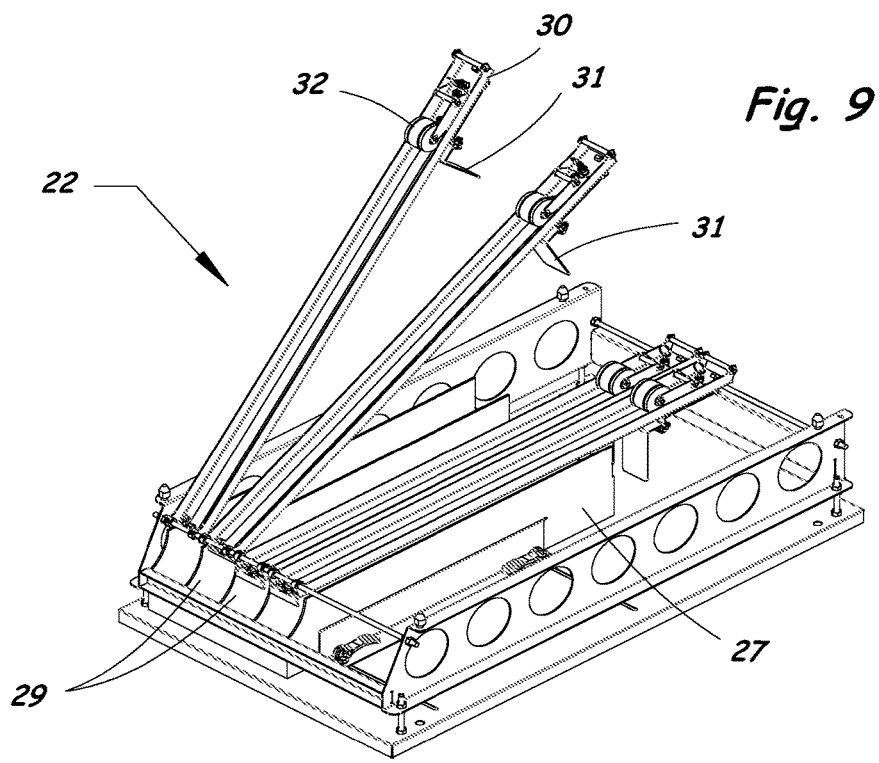
FIG. 9 is a perspective view of a tray in which a box of seed packets can be loaded.
Figure 10:
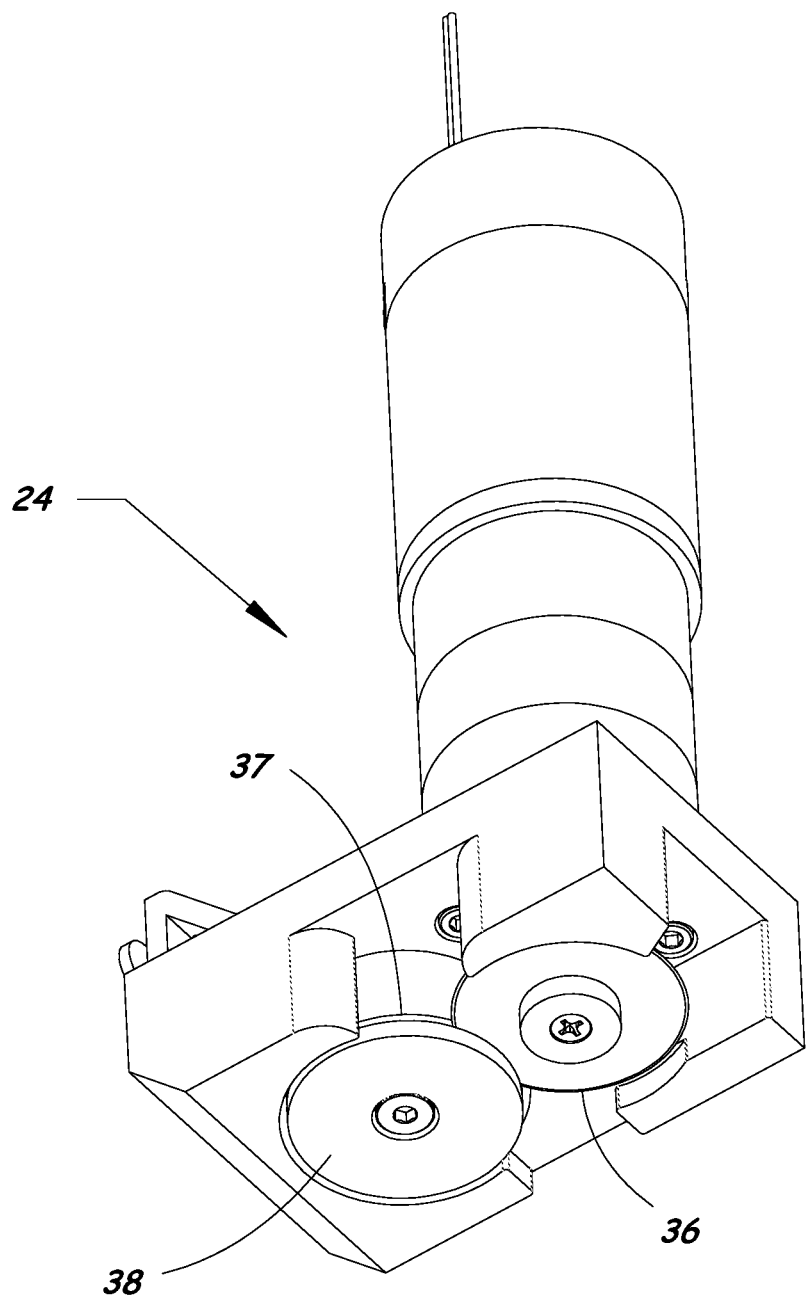
FIG. 10 is a perspective bottom view of a motorized cutter for removing the tops of seed packets.
Figure 11:
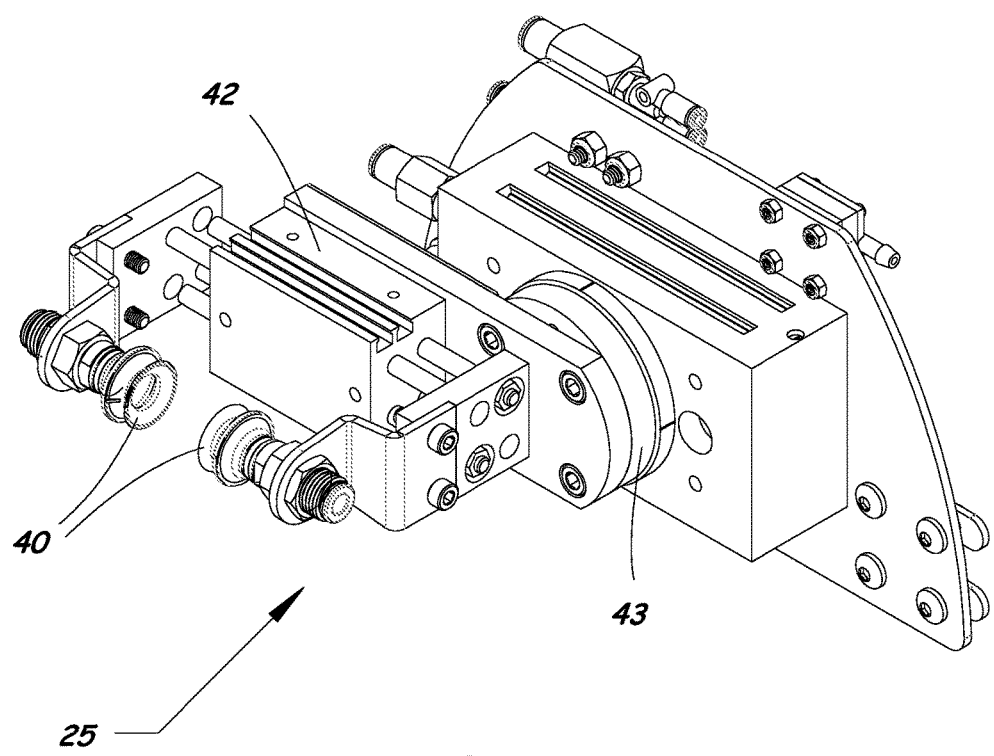
FIG. 11 is a perspective view of a second actuator for flipping the seed packets upside down to dump the seeds into a seed chute of a planter.

FIG. 1 shows a research plot planter 10 being pulled by a tractor 11 through a research plot field 12. The research plot field 12 is used by researchers to obtain yield and growth data for different seed types, and therefore contains several individual seed plots, with each plot containing one or more rows and with alleyways separating the end of the rows of one plot from the beginning of the rows of the next plot. For example, the research plot field 12 may have as many as several hundred or even thousands of individual plots separated by alleyways that mark the end of one plot and the beginning of another plot.

The planter 10 shown in FIG. 1 has eight row units 13 that plant eight rows at a time as the planter 10 makes a pass through the field. Each row unit 13 has, among other things, a furrow opener, a seed meter assembly 14, a seed tube for guiding seeds from the seed meter assembly 14 into the furrow created by the opener, and a furrow closing assembly 16.

The planter 10 shown in FIG. 1 shows a conventional arrangement of handling seed packets on the right side using a human operator 17 seated on the planter 10. The human operator 17 is seated near a box 18 containing seed packets that must be individually opened and dumped into the seed meter assemblies 14 of the planter row units 13 for each of the plots.

On the left side of the planter 10 shown in FIG. 1, an automated seed packet handling machine 20 of the present invention is used instead of a second human operator. Alternatively, two automated seed packet handling machines 20 may be provided on the planter to replace both human operators. A computer controller 21 on the planter 10 is used to control the operation of the seed packet handling machine 20. GPS or other position signals can be used by the controller 21 to determine where each plot starts and stops and the locations of the alleys according to a predetermined research field layout. The computer controller 21 also receives and stores information from an RFID or bar code reader that allows it to keep track of information and planted location for each different seed type planted in the field.

The automated seed packet handling machine 20 is illustrated in detail in FIGS. 2 to 11. The machine 20 includes a tray 22, a first actuator 23, a cutter mechanism 24, a second actuator 25, and a seed chute 26 for conveying seeds to a seed meter 14 of a planter row unit 13.

The tray 22 is used for holding a box 27 containing paper envelopes, which are referred to herein as seed packets 28. The box 27 can be of the type normally used by seed researchers, which includes a plurality of rows separated by row dividers 29. In the illustrated embodiment, the box 27 contains four rows, with each row containing approximately 40 to 50 seed packets. The tray 22 includes a spring-loaded pusher assembly 30 for pushing the rows of seed packets 28 to the front of the box 27. The pusher assembly 30 includes a separate pusher 31 that engages the seed packet 28 at the back of each seed packet row, and a spring 32 for biasing the pusher 31 in a direction toward the front of the box 27. The tray 22 is illustrated in more detail in FIG. 9.

The first actuator 23 is a three-axis linear actuator that functions to lift a seed packet 28 out of the box 27 and move the seed packet 28 to the cutter mechanism 24. The first actuator 23 has a pair of suction cups 33 for engaging and lifting and holding the seed packet 28. The first actuator 23 can be moved in an axial direction of the suction cups 33 to move the suction cups 33 toward and away from the seed packets 28 in the box 27. The first actuator 23 can be moved in a vertical direction along vertical guides 34 to lift the seed packets 28 out of the box 27. The first actuator 23 can be moved in a horizontal direction along horizontal rails 35 to move the seed packets 28 toward and through the cutter mechanism 24. The first actuator 23 is illustrated in more detail in FIG. 8.

The cutter mechanism 24 is arranged to cut off a top portion of a seed packet 28. The cutter mechanism 24 is a motorized cutter having a circular rotary blade 36 that fits in a groove 37 of an adjacent rotary wheel 38. The seed packet 28 is carried to and through the cutter mechanism 24 by the suction cups 33 of the first actuator 23. The cut off top portion of the seed packet 28 falls into a trash bin 39 located adjacent to the cutter mechanism 24. The cutter mechanism 24 is illustrated in more detail in FIG. 10.

The second actuator 25 is located downstream of the cutter mechanism 24. After the seed packet 28 passes through the cutter mechanism 24, the first actuator 23 hands off the seed packet 28 to the second actuator 25. The second actuator 25 has a pair of suction cups 40 positioned on opposite planar sides of the seed packet 28, which provide a means for grabbing and holding the seed packets 28. The second actuator 25 also has a mechanism 42 for moving the suction cups 40 toward and apart from each other to grip and spread the sides of the seed packets 28 open. The suction cups 40 allow the second actuator 25 to hold the seed packet 28 and to spread the sides of the seed packet 28 open when the seed packet 28 is dumped. The second actuator 25 also includes a rotary mechanism 43 that can be operated to flip the seed packet 28 upside down to dump the contents of the seed packet 28 into the seed chute 26. After the seed packet 28 is dumped into the seed chute 26, the empty packet 28 is deposited into the trash bin 39. The second actuator 25 is illustrated in more detail in FIG. 11.

An RFID antenna 41 is provided on the machine 20 for reading an RFID tag on each seed packet 28 as the seed packet 28 is being handled. For example, the RFID antenna 41 can be located along the path traveled by the first actuator 23 between the box 27 and the cutter mechanism 24. Information gathered by the RFID antenna 41 is stored in the computer controller 21 to keep track of the planted location for each different seed type planted in the field. Alternatively, a bar code reader can be used instead of the RFID antenna 41 to read bar codes on the seed packets 28.

The operation of the seed packet handling machine 20 will now be described with reference to FIGS. 12 to 17.

Figure 12:
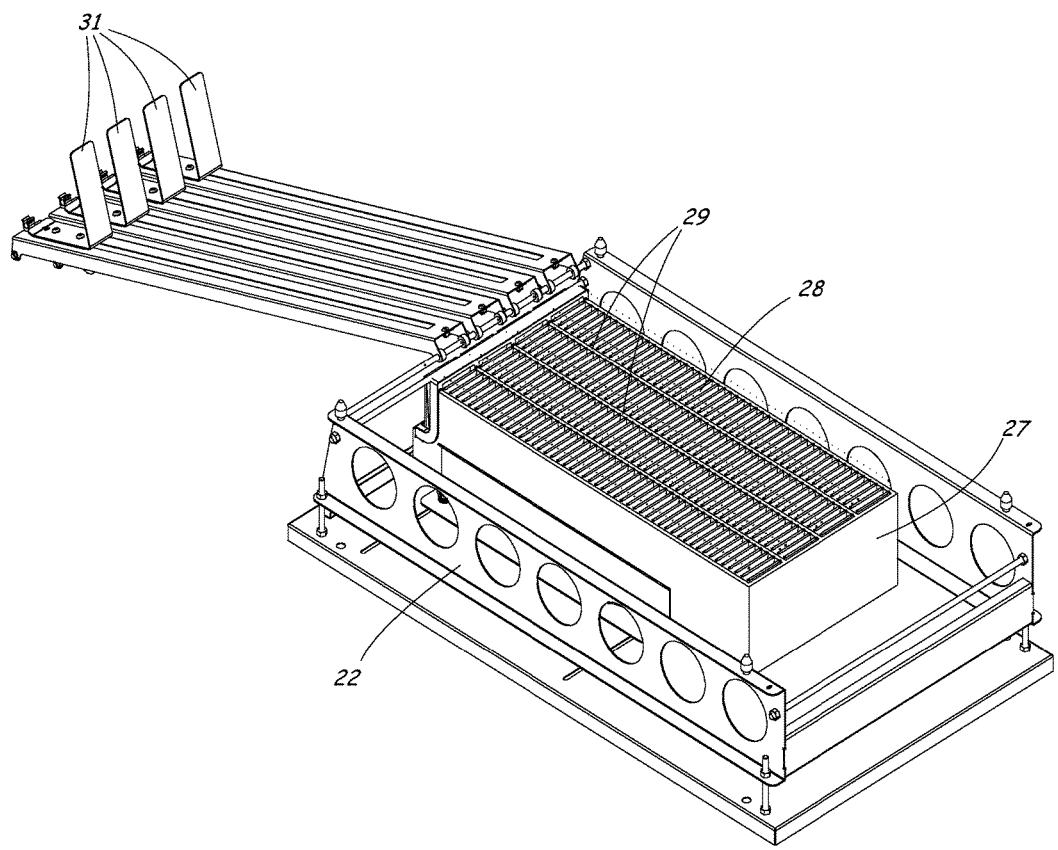
FIGS. 12 to 17 are a series of perspective views showing the operation of the automated seed packet handling machine.
Figure 13:
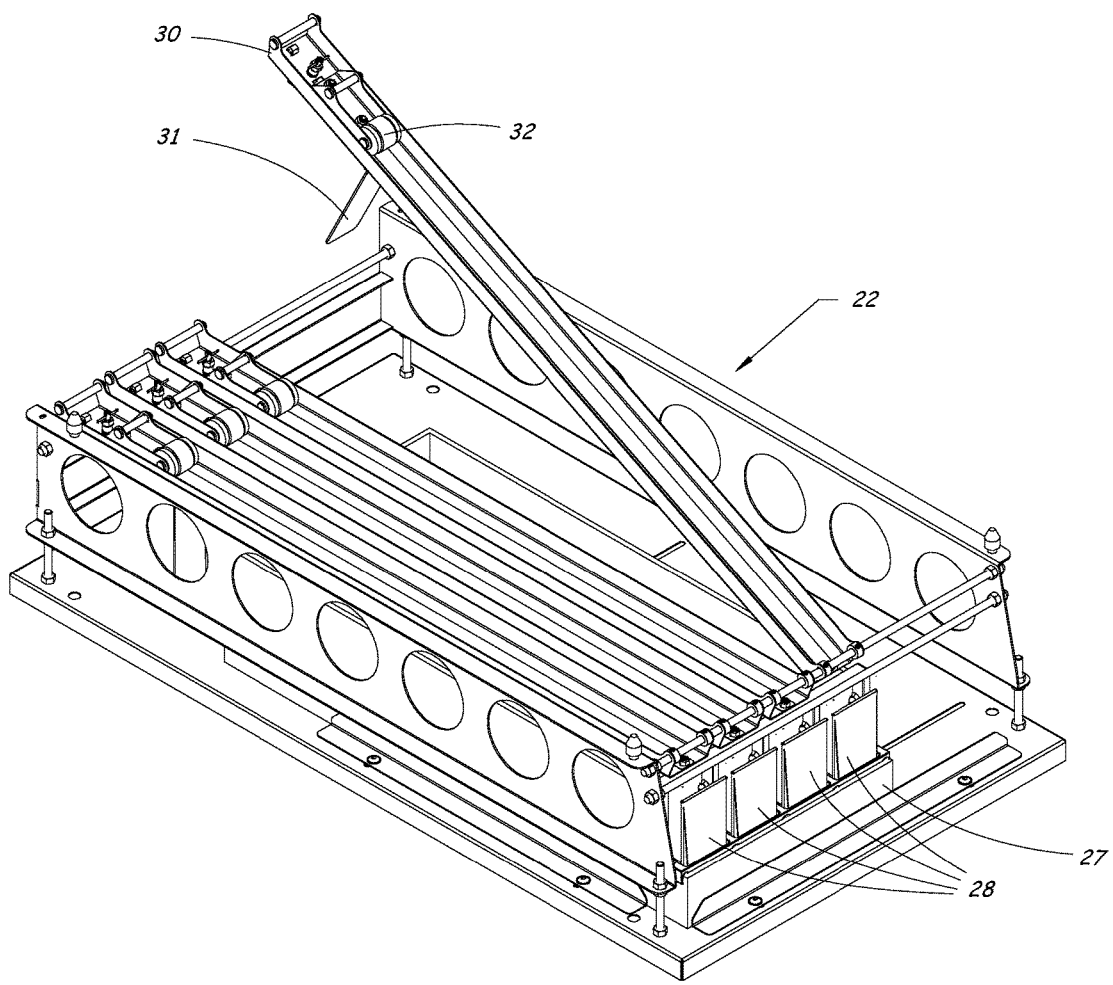

A box 27 containing the seed packets 28 is loaded on the machine 20, as shown in FIG. 12. The box 27 fits into the tray 22, which can be adjusted to fit various sizes of boxes. The tray 22 has a spring-loaded pusher 31 (shown in FIG. 13) for each row of the box 27 that keeps the packets 28 pushed to the front of the box 27. The loaded tray 22 is then placed on the machine 20. The machine 20 can also be made to accommodate multiple box trays 22 that are automatically switched out when empty.

Figure 14:
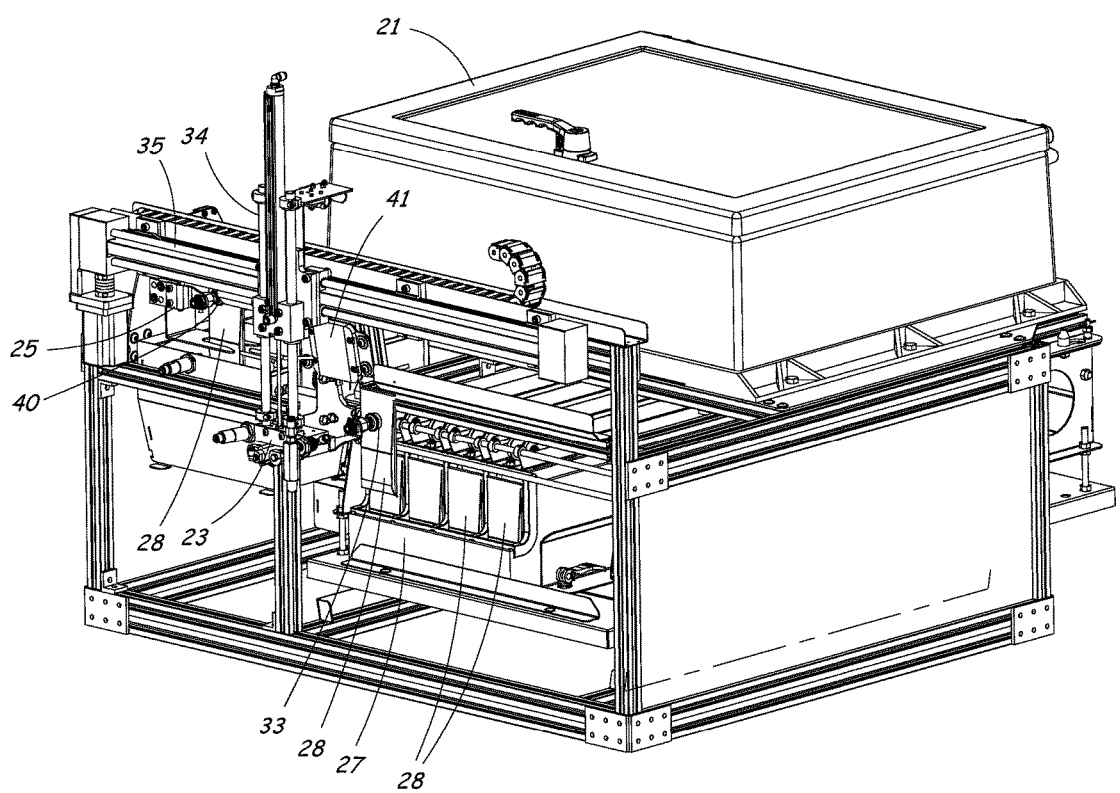

When the machine 20 receives a signal, the first actuator 23 lifts a seed packet 28 out of the box 27 via the suction cups 33, as shown in FIG. 14. The seed packet 28 is then moved close to the RFID antenna 41 to read the RFID tag on the packet 28. The tag ID and plot location are saved to a file on the computer controller 21.

Figure 15:
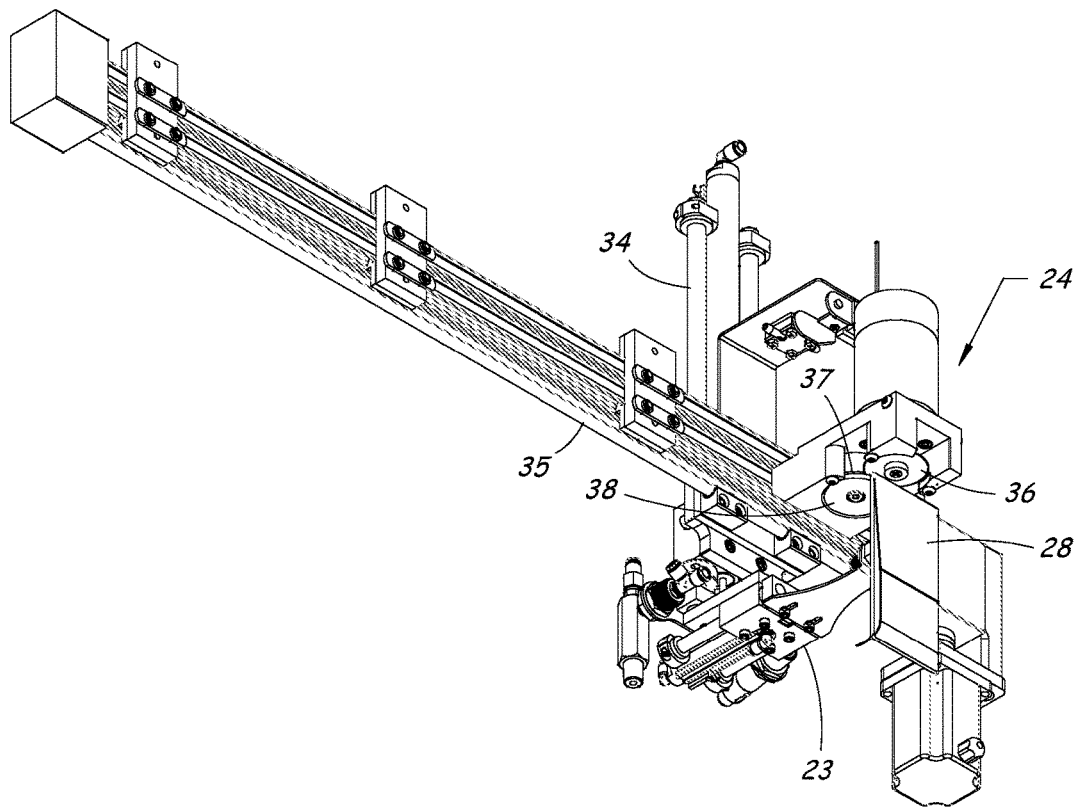
Figure 16:
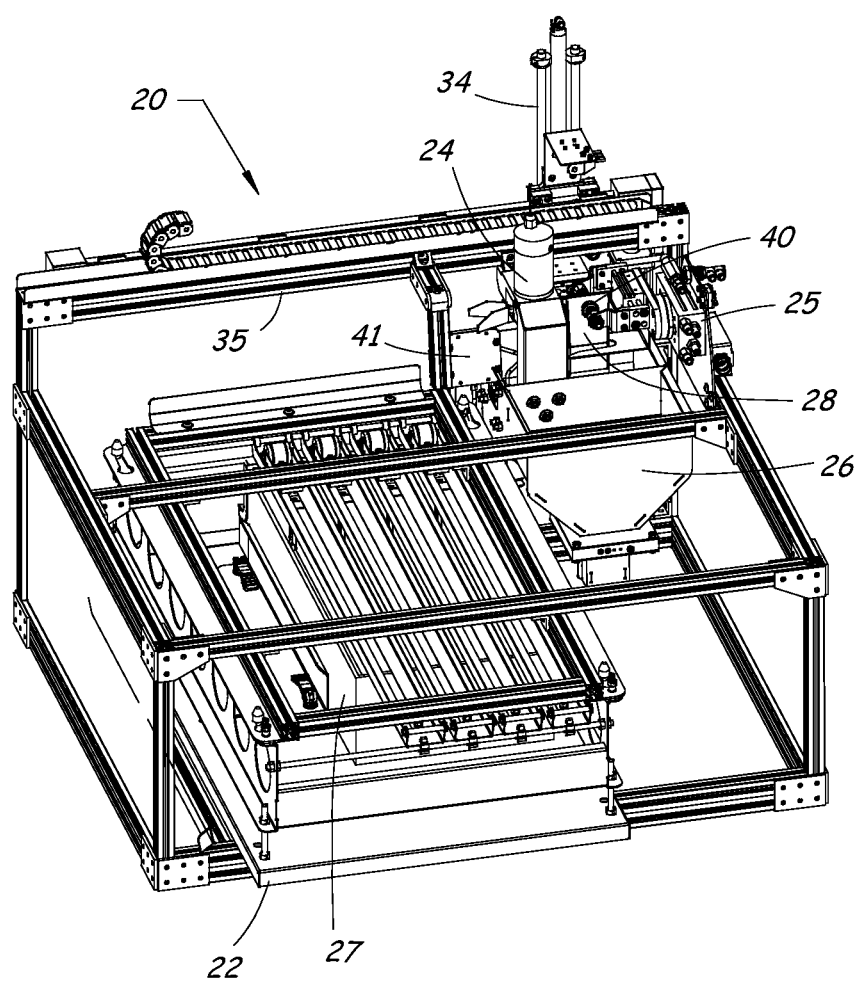

After moving past the RFID antenna 41, the seed packet 28 passes through the cutter mechanism 24 to remove the top portion of the packet 28, as illustrated in FIG. 15. The removed top is discarded in the trash bin 39 located below the cutter mechanism 24. The seed packet 28 is then handed off to the second actuator 25 to wait for a signal to dump the seeds, as shown in FIG. 16.

Figure 17:
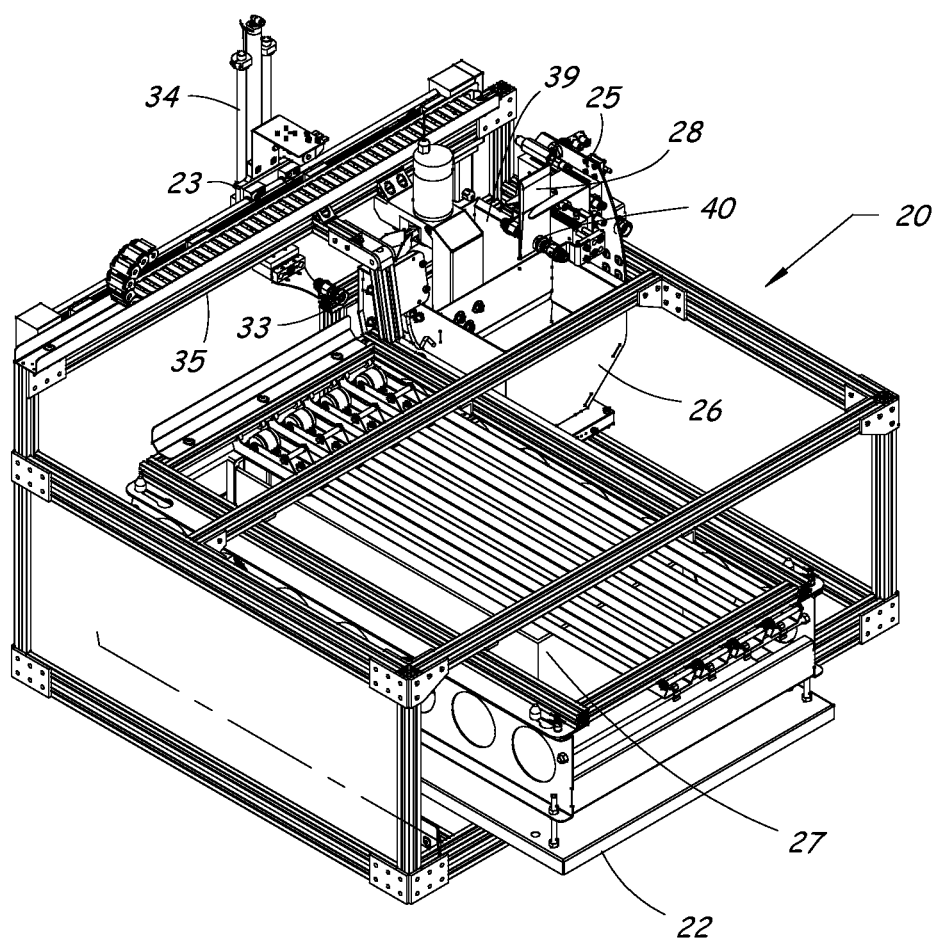

Once the machine 20 receives a signal to dump, the second actuator 25 rotates the suction cups 40 to flip the packet 28 upside down to dump the seeds into the seed chute 26, as illustrated in FIG. 17. The second actuator 25 also moves the suction cups 40 apart from each other to spread the sides of the seed packet 28 open when the packet 28 is being dumped to ensure that all of the seeds contained in the packet 28 fall into the chute 26. The second actuator 25 then returns to its starting position, drops the empty packet 28 in the trash bin 39, and waits for the next packet. The process is repeated until all of the boxes are empty.

While the invention has been specifically described in connection with specific embodiments thereof, it is to be understood that this is by way of illustration and not of limitation, and the scope of the appended claims should be construed as broadly as the prior art will permit.

What is claimed is:

1. A research plot seed planter, comprising:
   at least one planter row unit having a seed meter with a seed chamber for receiving seeds to be planted;
   a seed chute for conveying seeds into the seed meter; and
   an automated seed packet handling machine for lifting a seed packet from a box, cutting off a top portion of the seed packet, and dumping the seeds from the seed packet into the seed chute;
   wherein said seed packet handling machine comprises a tray for holding a box containing a plurality of seed packets; and
   wherein said tray comprises a spring-loaded pusher arranged to keep seed packets pushed to the front of the box.

2. The planter according to claim 1, wherein said box contains a plurality of rows of seed packets, and said spring-loaded pusher comprises separate spring-loaded pushers for each row of seed packets.

3. A research plot seed planter, comprising:
   at least one planter row unit having a seed meter with a seed chamber for receiving seeds to be planted;
   a seed chute for conveying seeds into the seed meter; and
   an automated seed packet handling machine for lifting a seed packet from a box, cutting off a top portion of the seed packet, and dumping the seeds from the seed packet into the seed chute;
   wherein said seed packet handling machine comprises a cutter mechanism for cutting off a top portion of a seed packet; and
   wherein said cutter mechanism is a motorized cutter having a circular rotary blade that fits in a groove of an adjacent rotary wheel.

4. The research plot seed planter according to claim 3, wherein said seed packet comprises a paper envelope; and wherein said cutter mechanism is arranged to cut off the top portion of the seed packet to open the seed packet before dumping the seeds from the seed packet into the seed chute.

5. The planter according to claim 3, wherein said seed packet handling machine comprises a tray for holding a box containing a plurality of seed packets.

6. The planter according to claim 3, wherein said seed packet handling machine comprises a first actuator for lifting the seed packet out of the box and moving the seed packet to the cutter mechanism.

7. The planter according to claim 3, wherein said seed packet handling machine further comprises an RFID antenna for reading an RFID tag on the seed packet.

8. The planter according to claim 7, further comprising a data logger for recording an ID of the RFID tag and a plot location for each seed packet.

9. The planter according to claim 3, further comprising a trash bin for receiving the cut off top portion of the seed packet after cutting and for receiving a remainder of the seed packet after the seeds are dumped into the seed chute.

10. A research plot seed planter, comprising:
    at least one planter row unit having a seed meter with a seed chamber for receiving seeds to be planted;
    a seed chute for conveying seeds into the seed meter; and
    an automated seed packet handling machine for lifting a seed packet from a box, cutting off a top portion of the seed packet, and dumping the seeds from the seed packet into the seed chute;
    wherein said seed packet handling machine comprises a first actuator for lifting a seed packet out of the box and moving the seed packet to a cutter mechanism; and
    wherein said first actuator is a three-axis linear actuator.

11. A research plot seed planter, comprising:
    at least one planter row unit having a seed meter with a seed chamber for receiving seeds to be planted;
    a seed chute for conveying seeds into the seed meter; and
    an automated seed packet handling machine for lifting a seed packet from a box, cutting off a top portion of the seed packet, and dumping the seeds from the seed packet into the seed chute;
    wherein said seed packet handling machine comprises a first actuator for lifting a seed packet out of the box and moving the seed packet to a cutter mechanism; and
    wherein said first actuator comprises at least one suction cup for engaging and lifting a seed packet.

12. A research plot seed planter, comprising:
    at least one planter row unit having a seed meter with a seed chamber for receiving seeds to be planted;
    a seed chute for conveying seeds into the seed meter; and
    an automated seed packet handling machine for lifting a seed packet from a box, cutting off a top portion of the seed packet, and dumping the seeds from the seed packet into the seed chute;
    wherein said seed packet handling machine comprises a first actuator for lifting a seed packet out of the box and moving the seed packet to a cutter mechanism; and
    wherein said seed packet handling machine further comprises a second actuator for flipping the seed packet upside down to dump seeds from within the packet into the seed chute after the top portion of the seed packet is cut off.

13. The planter according to claim 12, wherein said second actuator is a rotary actuator that has a means for grabbing and flipping the seed packets upside down when the machine receives a signal to dump.

14. The planter according to claim 12, wherein said second actuator comprises a pair of suction cups positioned on opposite planar sides of the seed packets, and wherein said second actuator comprises a mechanism for moving the pair of suction cups toward and apart from each other to grip and spread the sides of the seed packets open when the seed packets are dumped.

15. A method of planting seed research plots, comprising:
providing a planter having at least one planter row unit comprising a seed meter with a seed chamber for receiving seeds to be planted;
providing a seed packet handling machine on the planter with a seed chute that directs seeds into the seed meter; and
using the seed packet handling machine to automatically lift individual seed packets containing a plurality of seeds from a box containing a plurality of seed packets, cut off a top portion of the seed packets, and dump the seeds from the seed packets into the seed chute to supply seeds to the seed chamber of the seed meter; and
further comprising holding the box containing seed packets in a tray, and using a spring-loaded pusher to keep seed packets pushed to a front of the box.

16. A method of planting seed research plots, comprising:
providing a planter having at least one planter row unit comprising a seed meter with a seed chamber for receiving seeds to be planted;
providing a seed packet handling machine on the planter with a seed chute that directs seeds into the seed meter; and
using the seed packet handling machine to automatically lift individual seed packets containing a plurality of seeds from a box containing a plurality of seed packets, cut off a top portion of the seed packets, and dump the seeds from the seed packets into the seed chute to supply seeds to the seed chamber of the seed meter; and
further comprising using a first actuator with suction cups to lift seed packets from the box and move the seed packets to a cutter mechanism that cuts off the top portion of the seed packets.

17. The method according to claim 16, further comprising using a second actuator with suction cups positioned on opposite sides of the seed packets to flip the seed packets upside down and spread the sides of the seed packets open when the seed packets are dumped.

18. The method according to claim 16, further comprising using an RFID antenna for reading an RFID tag on the seed packet, and recording an ID of the RFID tag and a plot location for each seed packet.

19. The method according to claim 16, further comprising automatically depositing into a trash receptacle the cut off top portion of the seed packet and a remainder of the seed packet after the seeds are dumped into the seed chute.

* * * * *